Dec. 31, 1929. A. SCHAU 1,741,587
REPLACEABLE CLINKER HOOK
Filed Oct. 5, 1923
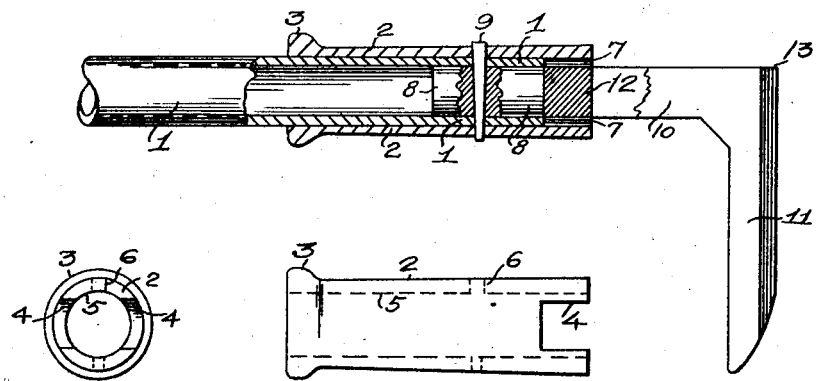
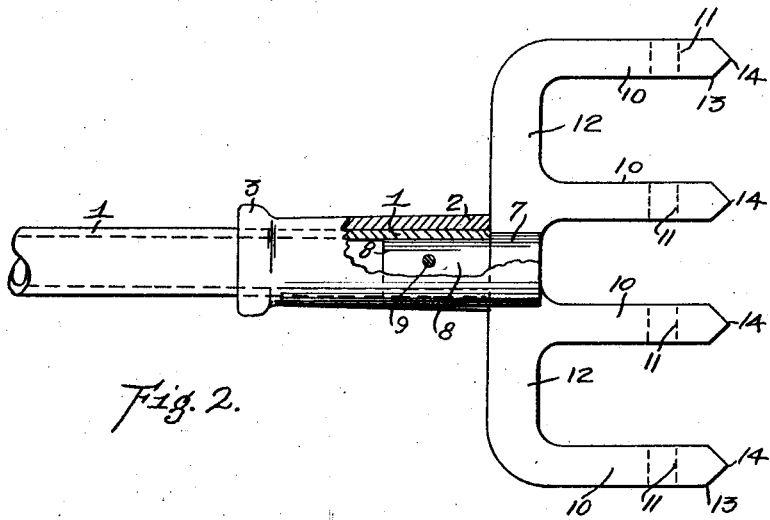

Patented Dec. 31, 1929

1,741,587

UNITED STATES PATENT OFFICE

ARTHUR SCHAU, OF VALPARAISO, INDIANA

REPLACEABLE CLINKER HOOK

Application filed October 5, 1923. Serial No. 666,869.

My invention relates to improvements in replaceable clinker hook and it more especially consists of the features hereinafter pointed out in the claims.

The purpose of my invention is to provide a clinker hook that is easily replaceable; that will serve both as a hook to remove clinkers and when inverted as a leveler of the fuel bed; that is rigid and firm; that is combined with a standard pipe handle and a tubular shank, all of which parts are quickly assembled in positive relation to each other; and that reduces the cost of up-keep because the handle and shank are continuously available whenever the hook portion requires replacement.

With these and other ends in view, I illustrate in the accompanying drawing such instances of adaptation as show the broad underlying features without limiting myself to the specific details disclosed thereon and described herein.

Figure 1 is a side elevation partly in section.

Fig. 2 is a top plan view of Fig. 1.

Fig. 3 is a detached side elevation of the removable shank.

Fig. 4 is a front end elevation of Fig. 3.

In practically carrying out my invention I may make my device of any desired material, ordinarily the hook part will be made from cast steel, the shank or sleeve of malleable iron and the handle of wrought iron gas pipe, but as stated these may be varied to suit any special requirements. Likewise the hook portion may have more or less teeth than the number shown on the drawing.

It has been found in actual practice that clinker hooks are made solid with the handle which necessitates discarding the entire tool when the teeth are burnt off, or welding the same handle onto another set of teeth,—a matter of expense and delay. With my device the parts are all attachable and detachable so as to be interchangeable at a moment's notice—only replacing the burnt up hook at a great saving of money and time. It is not alone the saving in cost of replacement of worn-out hooks but all too frequently through accident or otherwise a hook becomes almost useless so as to make efficient and economical firing impossible.

As instanced in the drawing a pipe 1 is used as a handle. This may be of any desired length to suit the wishes of the user. It passes inside of the shank 2 as shown in Fig. 1. The shank has an opening 5 throughout its length of about the same size as the outside diameter of the handle 1. At the rear end of the shank an annular reinforcing enlargement 3 is formed and at the front end of the shank a lateral notch 4 is formed which is less in width than the diameter of the shank opening 5.

The angular shaped teeth 10 of the hook are joined by a head 12 of rectangular cross section. This head midway of its length has a cylindrical projection 8 formed thereon and a cylindrical enlargement 7 formed on the head whose diameter is concentric with that of the projection 8. A handle 1 of ordinary pipe fits over the projection 8 and a tubular shank 2 whose inside diameter is substantially the same throughout its length fits over the outside of the handle 1 and also extends over the cylindrical enlargement 7 of the head. The parts 1, 2, 8 and 7 are in substantial parallel relation to each other.

The projection 8, the shank 2 and the handle 1 may be held together in a detachable manner by any desired means, such for instance as a taper pin 9 shown in Fig. 1 which will always secure the parts tightly to each other. This of necessity requires a companion taper hole 6 both of which compel the parts to be assembled in a given relation before the pin can be inserted. A practical alternative may be used in the shape of a straight tight fitting pin slightly riveted at each end after being placed in position, or if desired, a threaded bolt or screw may be used as a substitute for the tapering pin.

The hook proper has forward extensions 10 which project from the head 12 on about the same plane as the rear projection 8. Projecting at right angles to the said extensions 10 are the teeth 11. The front edges of the teeth 11 are V shaped at 14 so as to make it easier to push the hook through a bed of fine coal when it is used upside down to level the fuel after the clinkers have been raked out. The teeth 11 where they join the projections 10 on their inner edges are reinforced by casting-in any desired shape of fillet. The terminating ends of the teeth 11 are made more or less pointed so as to easily enter a fuel bed.

In view of the fact that clinker hooks are subjected to great variations of temperature, they are liable to pass out of commission at the most unexpected times. With my device several replaceable hooks may be kept in reserve so that in a few moments a damaged hook whose teeth may have been melted off can be replaced and the firing carried on efficiently without interruption. On this ground alone my hooks will in a short time pay for themselves through the actual savings in time and fuel, brought about through their use.

My invention is not to be confused with other and dissimilar constructions heretofore found in spading forks, pitch forks, garden implements, shovels, etc., for with such tools the parts are permanently secured together and the conditions under which they are used do not bring about the necessity for replacement of any damaged or broken parts. In contrast in the case of stoking furnaces the conditions are so severe that in hand-feeding, prevalent in the majority of cases, the hooks inevitably sooner or later and most frequently sooner become so badly damaged that replacement is absolutely necessary.

What I claim is:

1. In attachable and detachable clinker hooks, a hook head, a cylindrical projection from the head of approximately uniform diameter, a cylindrical enlargement formed on the head concentric with the projection, an elongated hollow sleeve or shank having notches at its front end the internal diameter of the shank engaging the cylindrical portion of the head and the notches engaging the flattened portion of the head on both sides of the cylindrical portion, adapted to cooperate with a hollow handle fitting inside of the shank and whose inside diameter engages the cylindrical projection, and means passing through the shank the tubular handle and the cylindrical projection for holding the parts assembled.

2. In attachable and detachable clinker hooks, a hook head, a cylindrical projection of uniform diameter extending from the hook head, a hollow handle of standard tubular shape having an opening therethrough of uniform diameter which opening fits over the cylindrical projection, a cylindrical enlargement of the hook head formed concentric with the cylindrical projection the outside diameter of such enlargement substantially coinciding with the outside diameter of the tubular handle, a long tubular shank having an opening therethrough of uniform diameter adapted to engage the tubular handle throughout the length of the shank and in addition engage the cylindrical projection of the head said shank having notches at its front end for engaging the flattened portions of the head on each side of the cylindrical projection, and means for holding the parts in assembled relation.

In testimony whereof I affix my signature.

ARTHUR SCHAU.